（12）United States Patent
Sethi et al.

(10) Patent No.: US 11,015,659 B2
(45) Date of Patent: May 25, 2021

(54) BOWED ROTOR PREVENTION SYSTEM FOR TURBOMACHINERY

(71) Applicant: GENERAL ELECTRIC COMPANY, Schenectady, NY (US)

(72) Inventors: Vineet Sethi, Houston, TX (US); Randall Kleen, Channelview, TX (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 16/355,297

(22) Filed: Mar. 15, 2019

(65) Prior Publication Data
US 2020/0291819 A1 Sep. 17, 2020

(51) Int. Cl.
| | |
|---|---|
| *F16D 23/02* | (2006.01) |
| *F01D 25/20* | (2006.01) |
| *F01D 15/08* | (2006.01) |
| *F01D 15/10* | (2006.01) |
| *F01D 15/12* | (2006.01) |
| *F16D 41/00* | (2006.01) |
| *F01M 1/02* | (2006.01) |
| *F01D 19/00* | (2006.01) |
| *F01D 25/34* | (2006.01) |

(52) U.S. Cl.
CPC .............. *F16D 23/02* (2013.01); *F01D 15/08* (2013.01); *F01D 15/10* (2013.01); *F01D 15/12* (2013.01); *F01D 19/00* (2013.01); *F01D 25/20* (2013.01); *F01D 25/34* (2013.01); *F01M 1/02* (2013.01); *F16D 41/00* (2013.01); *F01M 2001/0253* (2013.01); *F05D 2220/31* (2013.01); *F05D 2220/76* (2013.01); *F05D 2240/50* (2013.01); *F05D 2260/4023* (2013.01); *F05D 2260/4031* (2013.01)

(58) Field of Classification Search
CPC .......... F01D 25/20; F01D 15/08; F01D 15/10; F01D 15/12; F16D 41/00; F16D 23/02; F01M 1/02; F01M 2001/0253; F05D 2220/76; F05D 2240/50; F05D 2220/31; F05D 2260/4031
USPC ........................................................ 60/431
See application file for complete search history.

(56) References Cited

U.S. PATENT DOCUMENTS 2,962,597 A * 11/1960 Evans ....................... F02C 7/26
290/2
3,520,642 A 7/1970 Fulton
(Continued)

*Primary Examiner* — Ninh H. Nguyen
*Assistant Examiner* — Brian Christopher Delrue
(74) *Attorney, Agent, or Firm* — Fletcher Yoder, P.C.

(57) ABSTRACT

A bowed-rotor prevention system for a turbomachine is disclosed. The system comprises a first turbomachine having a first shaft rotatably supported by a plurality of bearings, a second turbomachine having a second shaft rotatably coupled to the first rotatable shaft, and a pump having a third shaft rotatably coupled to the second shaft. The system further includes a gear box having a fourth shaft rotatably coupled to the third shaft by an clutch configured to operate in a freewheel condition when the first shaft is rotating faster than a first predetermined speed, and further configured to rotatably engage the fourth shaft to the third shaft when the first shaft is rotating slower than a second predetermined speed to thereby drive a rotation of the third shaft, wherein the first predetermined speed is faster than the second predetermined speed.

22 Claims, 3 Drawing Sheets

(56) References Cited

U.S. PATENT DOCUMENTS

| | | | | |
|---|---|---|---|---|
| 3,913,325 A * | 10/1975 | Miyao | ............... | F16H 47/04 |
| | | | | 60/431 |
| 4,380,146 A * | 4/1983 | Yannone | ............ | F02C 9/26 |
| | | | | 60/39.281 |
| 4,629,033 A * | 12/1986 | Moore | ............. | F01M 5/00 |
| | | | | 184/27.2 |
| 4,663,937 A * | 5/1987 | Cullin | ............. | H02K 7/00 |
| | | | | 180/65.245 |
| 4,829,850 A | 5/1989 | Soloy | | |
| 6,168,377 B1 | 1/2001 | Wolfe et al. | | |
| 6,517,314 B1 | 2/2003 | Burnett et al. | | |
| 6,705,840 B1 | 3/2004 | Hauser et al. | | |
| 9,664,070 B1 | 5/2017 | Clauson et al. | | |
| 10,036,347 B1 * | 7/2018 | Sherry | ............. | F02G 5/04 |
| 10,508,567 B2 * | 12/2019 | Stachowiak | ......... | B64D 35/00 |
| 10,598,047 B2 * | 3/2020 | Clauson | ........... | F01D 21/00 |
| 10,625,881 B2 * | 4/2020 | Teicholz | ........... | B64F 1/34 |
| 10,661,649 B2 * | 5/2020 | Waldner | ........... | B60K 6/365 |
| 10,718,231 B2 * | 7/2020 | Orkiszewski | ......... | F01D 25/34 |
| 10,760,498 B2 * | 9/2020 | Cannella | ........... | F02C 7/275 |
| 2014/0318144 A1 * | 10/2014 | Lazzeri | ............ | F01D 21/18 |
| | | | | 60/772 |
| 2014/0366546 A1 * | 12/2014 | Bruno | ............. | F02C 9/00 |
| | | | | 60/772 |
| 2016/0091061 A1 * | 3/2016 | Erjavec | ............ | F16H 3/72 |
| | | | | 475/2 |
| 2016/0105078 A1 * | 4/2016 | Santini | ............ | F16H 47/02 |
| | | | | 290/52 |
| 2017/0234237 A1 * | 8/2017 | Pech | ............. | F02C 7/277 |
| | | | | 60/778 |
| 2018/0126836 A1 * | 5/2018 | Waldner | ........... | H02P 5/753 |
| 2020/0282820 A1 * | 9/2020 | Waldner | ........... | H02P 5/753 |

* cited by examiner

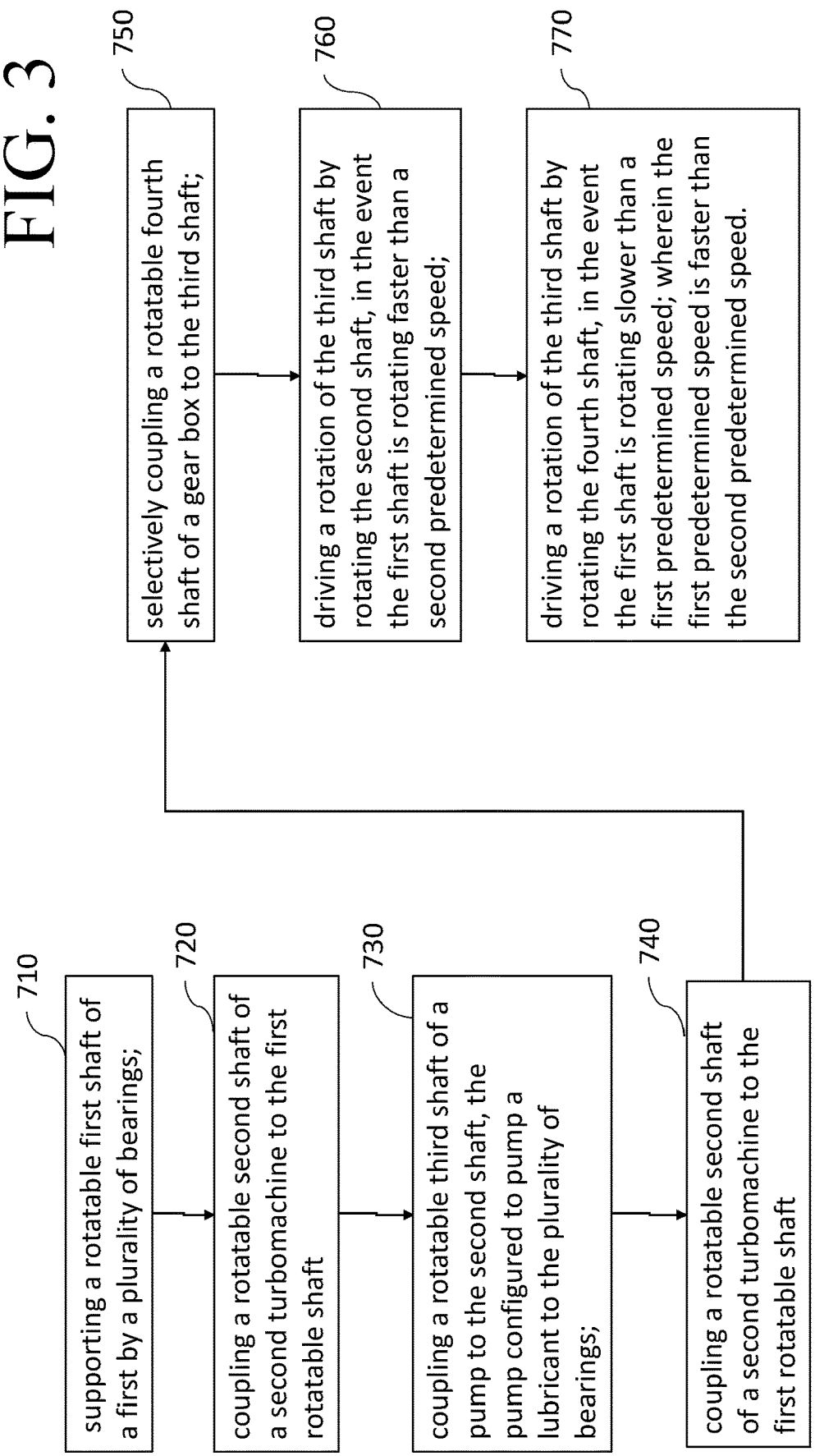

BOWED ROTOR PREVENTION SYSTEM FOR TURBOMACHINERY

TECHNICAL FIELD

Embodiments of the invention relate generally to bowed rotor prevention systems for turbomachinery, such as gas turbines generators, and more specifically to an integrated lubrication system and gear drive system and method.

BACKGROUND

Large turbomachines such as, for example, gas turbines, generally include a generator having a rotor shaft which is positioned and supported by a plurality of bearings axially spaced along the shaft. These bearings are typically flood-lubricated with oil and the rotating shaft is supported by a film of oil present between the rotating shaft and the surface of the bearing. Commonly, the shaft is oriented horizontally with its weight supported by a plurality of journal bearings and its axial position maintained by a thrust bearing. Oil is supplied to the bearings to maintain the integrity of the bearing surfaces in proximity to the shaft and to maintain the close clearances and tolerances between the turbine rotor and the stationary components of the turbine. The loss of a flow of oil to these bearings during any type of operation is undesirable and results in damage and breakdown.

Various lubrication systems are currently utilized to supply oil to the bearings of large gas turbines. A main shaft-driven oil pump is typically the primary device used to deliver oil in conventional lubrication systems. The main oil pump is mechanically coupled to the rotor shaft and is driven by a rotation of the shaft. Generally, the main shaft-driven oil pump is disposed at the elevation of the centerline of the turbomachinery, and pumps oil from an oil reservoir or sump disposed at a lower level to the inlet of the main pump at a pressure to meet the suction pressure requirements of the main pump.

The main oil pump is typically a shaft-driven pump such as a centrifugal or positive displacement type pump which is operative to provide a flow of oil at a high pressure into its discharge line. However, such shall-driven pumps require a minimum rotor speed (e.g., 500-1000 revolutions per minute (RPM) to provide an adequate flow of oil to prevent damage to the rotor or bearings.

For instances when the turbomachine rotor shaft is rotating at a low speed (such as during a start-up operation of the turbine), the speed of the rotor shaft may too slow (e.g., less than 1000 RPM) to enable the main pump to sustain a sufficient output flow of oil. Accordingly, conventional lubrication systems may also include at least a secondary, or "back-up", oil pump, such as a centrifugal or positive displacement pump, Whose output is fluidly coupled to the supply line to the bearings of the turbine. For example, the secondary pump may be driven by a DC motor and used to supply oil to the bearings whenever the turbine is operating below a self-sustaining speed of the main oil pump such as when the turbine is being started or shut down.

Additionally, it is well known that when a gas turbine engine is shutting down, the drive train is at an elevated temperature and, because of heat rise, the upper portions of the engine will be hotter than lower portions of the drive train. In such instances, especially those without adequate lubrication flow, the generator rotor shaft may exhibit a thermal gradient across its cross-section (i.e., be hotter on the outer portions of its cross section than the inner portions. This condition may result in uneven thermal expansion resulting in a deflection of the shaft, often referred to as a "bowed rotor" condition. Continued operation of a generator having a bowed rotor is undesirable and will result in damage or breakdown of the various components.

Accordingly, some prior art systems may also employ an additional drive motor, such as an electric motor coupled to the turbine shaft, to drive rotation of the gas turbine through an engine accessory gearbox generally referred to as a "turning gear" or "jacking gear". The additional drive motor is arranged to rotate the turbomachinery at a very low speed (e.g., less than 15 RPM) to equalize the thermal gradient of the rotating parts after engine shutdown. Upon engine shutdown, the additional motor may be controlled, using an electrical motor controller, to rotate the turbomachinery for a predetermined period of time (e.g., 30-40 minutes) at a predetermined speed in order to avoid the thermal gradient and thereby prevent a bowed rotor condition. Other known solutions use an external portable source, such as a pneumatic system, as the drive motor to rotate the turbomachinery at a very low speed. However, providing such additional motors and associated electronic controls to drive the turbomachinery adds considerable cost and requires additional space to locate equipment.

BRIEF DESCRIPTION

A bowed-rotor prevention system for a turbomachine is disclosed. The system comprises a first turbomachine having a first shaft rotatably supported by a plurality of bearings, a second turbomachine having a second shaft rotatably coupled to the first rotatable shaft, and a pump having a third shaft rotatably coupled to the second shaft, the pump configured to pump a lubricant to the plurality of bearings. The system further includes a gear box having a fourth shaft rotatably coupled to the third shaft by a clutch, the clutch configured to operate in a freewheel condition when the first shaft is rotating faster than a first predetermined speed, and further configured to rotatably engage the fourth shaft to the third shaft when the first shaft is rotating slower than a second predetermined speed to thereby drive a rotation of the third shaft, wherein the first predetermined speed is faster than the second predetermined speed.

A method of a preventing a bowed rotor condition of a turbomachine is also provided. The method comprises supporting a rotatable first shaft of a first by a plurality of bearings, coupling a rotatable second shaft of a second turbomachine to the first rotatable shaft, coupling a rotatable third shaft of a pump to the second shaft, the pump configured to pump a lubricant to the plurality of bearings, and selectively coupling a rotatable fourth shaft of a gear box to the third shaft. The method also includes driving a rotation of the third shaft by rotating the second shaft, in the event the first shaft is rotating faster than a second predetermined speed, and driving a rotation of the third shaft by rotating the fourth shaft, in the event the first shaft is rotating slower than a first predetermined speed, wherein the first predetermined speed is faster than the second predetermined speed.

BRIEF DESCRIPTION OF THE DRAWINGS

The present invention will be better understood from reading the following description of non-limiting embodiments, with reference to the attached drawings, wherein below:

FIG. 3 is a flow diagram according an embodiment of a method to prevent a bowed rotor condition.

DETAILED DESCRIPTION

Figure 1:
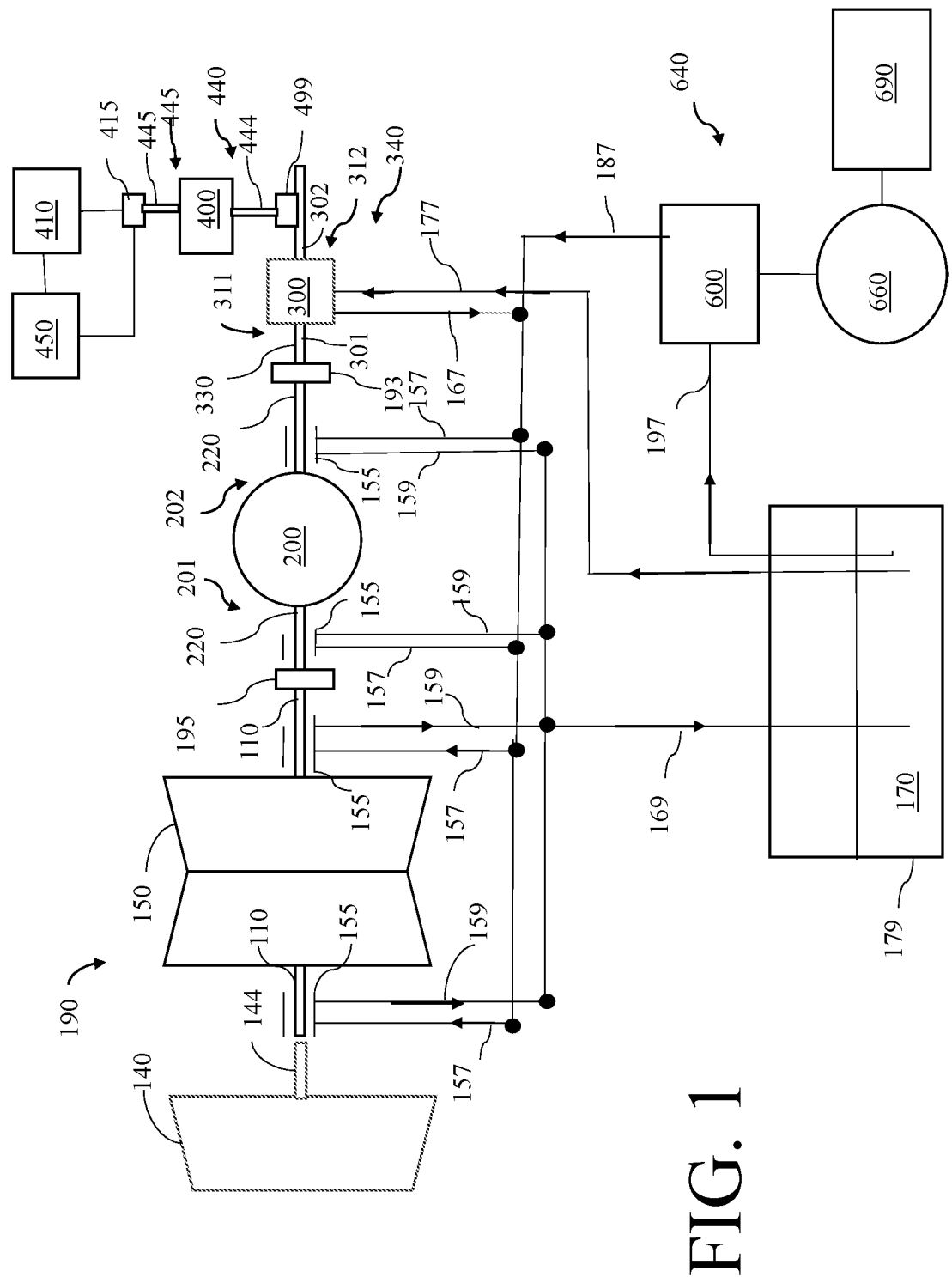
FIG. 1 is a schematic diagram of an embodiment of a bowed rotor prevention system.

Reference will be made below in detail to exemplary embodiments of the invention, examples of which are illustrated in the accompanying drawings. Wherever possible, the same reference characters used throughout the drawings refer to the same or like parts, without duplicative description.

While the embodiments disclosed herein are primarily described with respect to gas turbines, it is to be understood that embodiments of the present invention may be applicable to other apparatus and/or methods that benefits from the teachings herein. As used herein "turbomachine", refers to any machine that transfers energy between a rotor and a fluid, and includes both turbines and compressors.

Additionally, while a shaft driven pump shall generally be referred to herein as an exemplary pump for purposes of this application, it will be appreciated that any other pump that constitutes a useful or beneficial input to an industrial operation may be used as well without departing from the scope of the claims.

FIG. 1 is a schematic diagram of an embodiment comprising an exemplary multi-stage gas turbine-generator set having a primary lubrication system therefor. A first turbomachine, such as turbine 190, includes a centrally-disposed rotatable first shaft 110. In some embodiments, the rotatable first shaft 110 comprises a turbine first shaft 110 that is "air-coupled" or arranged as a free-turbine type shaft, to extract power from an exhaust stream of an upstream turbomachine 140 having a shaft 144 disposed upstream of the turbine 190 (i.e., the turbine first shaft 110 may not be physically connected to the upstream turbomachine or upstream turbomachine shaft 144) such that an exhaust airflow of the upstream turbomachine (not shown) rotates the turbine 190 in a known manner. In other embodiments, the turbine first shaft 110 may be coupled to the upstream turbomachine shaft 144 via a direct coupling (not shown). A rotatable second shaft 220 of a second turbomachine, such as electric generator 200, is coupled to the turbine first shaft 110 via a coupling 195. A motive fluid (e.g., steam) is supplied to turbine sections 140 and 150 in a known manner to cause the turbine first shaft 110 to rotate and thereby turn the generator rotatable second shaft 220 to drive generator 200. In embodiments, turbine first shaft 110 is disposed on a first side 201 of the generator 200. A plurality of bearings 155, may rotatably support at least one of the rotatable first shaft 110 and the rotatable second shaft 220. A thin film of oil (not shown) is disposed in a known manner there between the surface of each bearing 155 and the surface of turbine first shaft 110. The bearings 155 may be any conventional bearing type such as commonly used in axial flow turbines and are oil lubricated as is known in the art. While FIG. 1 depicts a single turbine first shaft 110 and four bearings 155 in support thereof, it should be appreciated that the first shaft 110 may comprise any number of first shafts 110 coupled together to enable the subject matter to operate as described herein. Likewise, it should also be appreciated that the position and number of bearings 155 as depicted in FIG. 1 is by way of example, and the plurality of bearings 155 may comprise any number of bearings 155 that enables the subject matter to operate as described herein.

Additionally, as depicted in FIG. 1, at least a portion of the plurality of bearings 155, may rotatably support the second rotatable shaft 220. A thin film of oil (not shown) is disposed in known manner therebetween the surface of each bearing 155 and the surface of second rotatable shaft 220. While FIG. 1 depicts the single second rotatable shaft 220 having two bearings 155 in support thereof, it should be appreciated that the shaft 220 may comprise any number of second rotatable shafts 220 coupled together to enable the subject matter to operate as described herein. Likewise, it should also be appreciated that the position and number of bearings 155 as depicted in FIG. 1 is by way of example, and the plurality of bearings 155 may comprise any number of bearings 155 that enables the subject matter to operate as described herein.

Each bearing 155 is supplied with a flow of oil through a respective supply conduit 157 and the oil is drained from each bearing 155 by a respective return conduit 159. Each supply conduit 155 is in fluid communication with a main supply line 167. The main supply line 167 is in fluid communication with a primary or main oil pump 300 which carries lubricating oil 170 up from an oil reservoir 179 via an oil feed line 177. Each return conduit 159 is in fluid communication with a main return line 169 which carries the oil from the return conduits 159 back to the oil reservoir 179. The oil reservoir 179 may be disposed at a lower elevation than turbine first shaft 110.

Embodiments include a primary lubrication system 340 having the main pump 300, which may be a shaft-driven pump 300 having a rotatable third shaft 330. The main pump 300 may be disposed on a second side 202 of the generator 200. The second side 202 of generator 200 may be opposing the first side 201. In other embodiments, the second side 201 of generator 200 may be orthogonal to the first side 201. In some embodiments, the main pump 300 comprises a conventional centrifugal pump wherein the third shaft 330 is a rotatable pump shaft 330. For example, as depicted in FIG. 1, the shaft-driven main pump 300 may comprise a conventional "through-shaft" type centrifugal pump having the pump shaft 330 shaft rotatably extending therethrough pump 300. A first end 301 of the pump shaft 330 is disposed on a first side 311 of pump 300 and extends therefrom, and a second end 302 of the pump shaft 330 is disposed on a second side 312 of pump 300 and extends therefrom. The first end 301 of the pump shaft 330 is coupled to the generator second rotatable shaft 220 by a coupling 193 to be driven thereby. In embodiments, the pump 300 is disposed on a second side 202 of the generator 200 and opposite the first side 201. In some embodiments, the coupling 193 may comprise a rigid type coupling such as a rigid sleeve or a flange coupling. In other embodiments, particularly those wherein the generator second rotatable shaft 220 and pump third rotatable shaft 330 are not arranged coaxially or there is a possibility of occurrence of loading shocks, coupling 193 may comprise a flexible coupling. For example, coupling 193 may comprise in various embodiments any of a flanged pin bush coupling, bibby coupling, gear tooth coupling, tyre coupling, elastomeric coupling, oldham coupling, universal coupling, and bellows coupling, without departing from the scope of the claims.

Figure 2:
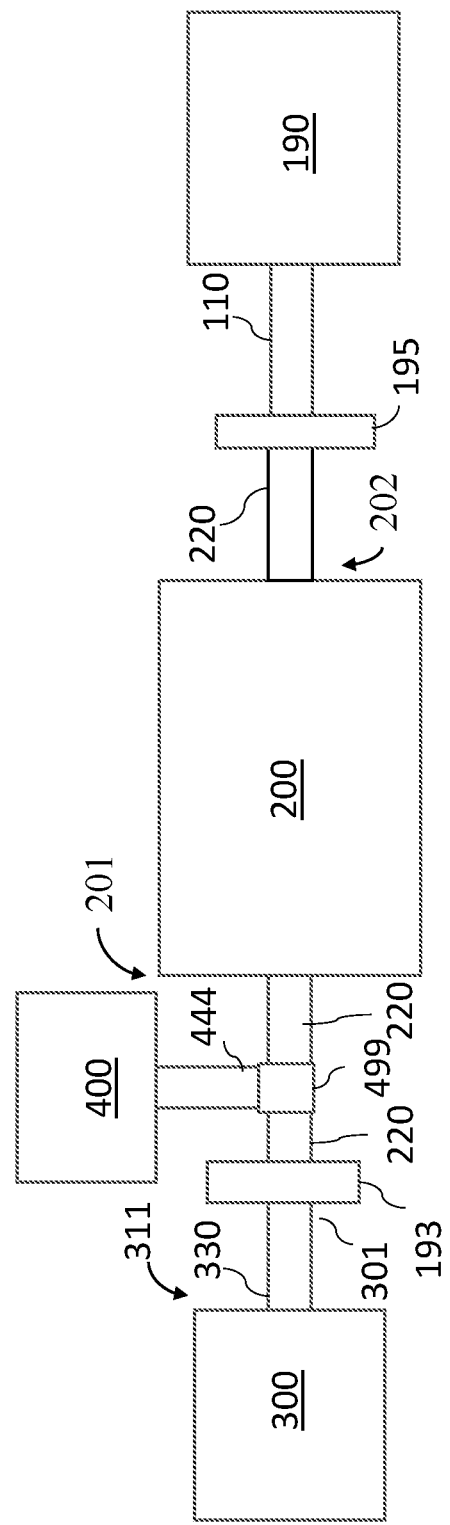
FIG. 2 is a schematic diagram of an alternative embodiment.

In other embodiments, the main pump 300 need not be a through-shaft type oil pump but may instead comprise a conventional pump comprising a third rotatable shaft 330 extending from a single side. For example, as depicted in the embodiment of FIG. 2, (with some parts for clarity) the shaft-driven main pump 300 may have the third rotatable shaft 330 shaft disposed only on the first side 311 of pump 300 and extending therefrom. A first end 301 of the pump third rotatable shaft 330 is coupled to the generator second rotatable shaft 220 by a coupling 193 to be driven thereby.

In various embodiments, a secondary lubrication system 640 is provided and may include a back-up or secondary pump 600 such as an electrical or diaphragm type pump as is well known in the art. The secondary pump 600 may be driven by a DC motor 660 and arranged to provide lubrication to the bearings 155 in instances when the turbine first shaft 110 is rotating at speed that is insufficient (i.e., too slow) to drive the pump third shaft 330 at a speed to enable the main pump 300 to sustain an adequate output flow of oil to the bearings 155. A secondary supply line 197 is in fluid communication with the secondary pump 600 and carries the lubricating oil 170 up from the oil reservoir 179 to the pump 600. An output line 187 is in fluid communication with the secondary pump 600 and the supply line 167. The output line 187 conveys the oil 170 from the pump 600 to the supply line 167 and to the bearings 155 of the turbine. A motor controller 690 may be used to trigger an operation o the secondary pump 600 based on predetermined conditions, such as a speed of the turbine first shaft 110.

The second end 301 of the pump third rotatable shaft 330 is rotatably coupled to a transmission or gear box 400 such as a conventional turning gear box or jacking gear. The gear box 400 is operative to selectively rotate the pump third rotatable shaft 330 at a very low speed (e.g., approximately ⅒ rpm) relative to the nominal operating speed of the turbine 190. The gear box 400 may be driven by a drive motor 410, such as an electric motor, which is rotatably coupled to an input 420 of the gear box 400, to drive rotation of the turning gear 400. For example, in embodiments, the gear box 400 uses a high-ratio rotating gear arrangement (not shown) or drive train in a known manner to transform the relatively high-speed rotation provided by the drive motor 410 at an input 420 of the gear box 400 to a relatively low-speed rotation at an output 440 of the gear box 400. In an embodiment, the output 440 of the gearbox 400 comprises a fourth rotatable shaft 444, and the input 420 of the gearbox 400 comprises a fifth rotatable shaft 445. In some embodiments, the turning gear drive motor 410 is a relatively low horsepower (e.g., 5 hp) motor that is mechanically coupled an input 420 of the gear box 400 and applies power and torque via a reduction gear arrangement (not shown) of the gear box 400. The drive motor 410 may be coupled to the input 420 by a coupling 415 or clutch arranged to selectively engage and disengage to a pinion or driving gear (not shown) of the gear box 400. In an embodiment, the selective rotational engagement of the drive motor 401 to the input 420 may be accomplished by means of a simple lever (not shown). In other embodiments, an automatic control system such as a motor controller 450 may be communicatively coupled to the motor 401 and coupling 415 and configured to selectively engage the motor 401 and coupling 415 to rotationally couple the drive motor 410 to the input 420 based on a predetermined condition, such as a speed of the turbine first shaft 110.

The output 440, such as the fourth rotatable shaft 444, of gear box 400 is rotatably coupled to and operative to drive a rotation of the pump third shaft 330, (e.g., when the coupling 415 is engaged). In an embodiment, the output shaft 440 of the gear box 400 is rotatably coupled to the pump third shaft 330 by a coupling such as a freewheel clutch 499, and thereby operative to selectively drive a rotation of the pump third shaft 330. Further, due to the rotational coupling of the generator second shaft 220 and the pump third shaft 330 (e.g., through coupling 193) as described herein, gearbox 400 is further operative to selectively drive a rotation of the generator shaft 220 thereby. Likewise, due to the rotational coupling of the generator second shaft 220 and the turbine first shaft 110 (e.g., through coupling 195) as described herein, gearbox 400 is further operative to selectively drive a rotation of the turbine first shaft 110 thereby. In embodiments, the gearbox 400 may drive a rotation of the pump third shaft 330, generator second shaft 220, and turbine first shaft 110, at a relatively low speed (e.g., less than 15 RPM).

In various embodiments, the freewheel clutch 499 may comprise one of an overrunning clutch, a sprag clutch, a slipper clutch, and a self-synchronizing clutch. In the event that the pump third shaft 330 is rotating faster than a first predetermined rotational speed of the turbine first shaft 110 (i.e., when the pump third shaft 330 is being driven by the generator second shaft 220 due to the rotation of the turbine first shaft 110 at a first predetermined speed), the freewheel clutch 499 is arranged to operate in a freewheel condition to disengage the gear box output shaft 440 from pump third shaft 330. The freewheel condition operation of the freewheel clutch 499 thereby prevents the pump third shaft 330 from driving a rotation of the gearbox output shaft 440. Conversely, in the event that the pump third shaft 330 is not rotating or is rotating slower than a predetermined speed (e.g., when the turbine is rotating at a second predetermined speed such as when it is in a shutdown operation, or in a free-rotor spin condition), the clutch 499 operates in an engaged condition to rotatably engage the gear box output shaft 440 to the pump third shaft 330. This engaged operation of the clutch 499 enables the gearbox output shaft 440 to thereby drive a rotation of the pump shaft 330 at a predetermined speed, and thus rotate turbine shaft 110 therethrough. The drive motor 410 may be controlled, using an electrical motor controller 450, to operate the gearbox 400 to thereby drive the pump shaft 330, and in turn, the generator second shaft 220 and turbine first shaft 110 for a predetermined period of time at a predetermined speed to prevent a bowed rotor condition.

In some embodiments, the gearbox 400 may be disposed on the second side 302 of the pump 300. In other embodiments, the gear box 400 may be disposed on the first side 301 of pump 300.

An embodiment of a method of preventing a bowed rotor condition of a turbomachine such as a generator is depicted in FIG. 3. The method comprises, at step 710, supporting a rotatable first shaft of a first by a plurality of bearings, 720 coupling a rotatable second shaft of a second turbomachine to the first rotatable shaft, 730 coupling a rotatable third shaft of a pump to the second shaft, the pump configured to pump a lubricant to the plurality of bearings. The method includes, at 740, selectively coupling a rotatable fourth shaft of a gear box to the third shaft. At 750, the method includes driving a rotation of the third shaft by rotating the second shaft, in the event the first shaft is rotating faster than a second predetermined speed and 760 driving a rotation of the third shaft by rotating the fourth shaft, in the event the first shaft is rotating slower than a first predetermined speed, wherein the first predetermined speed is faster than the second predetermined speed.

While the dimensions and types of materials described herein are intended to define the parameters of various embodiments, they are by no means limiting and are merely exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A bowed rotor prevention system for a turbomachine, comprising:
   a first turbomachine having a first shaft;
   a machine having a second shaft rotatably coupled to the first rotatable shaft;
   a plurality of bearings supporting at least one of the first and second rotatable shafts;
   a pump having a third shaft rotatably coupled to the second shaft, the pump configured to pump a lubricant to the plurality of bearings;
   a gear box having an output comprising a fourth shaft rotatably coupled to the third shaft by a clutch configured to operate in a freewheel condition based on a first predetermined rotational speed of the first shaft, and further configured to rotatably engage the fourth shaft to the third shaft based on a second predetermined rotational speed of the first shaft, to thereby drive a rotation of the third shaft.

2. The bowed rotor prevention system of claim 1, wherein the clutch is configured to operate in the freewheel condition when the first shaft is rotating faster than the first predetermined rotational speed.

3. The bowed rotor prevention system of claim 2, wherein the clutch is further configured to rotatably engage the fourth shaft to the third shaft when the first shaft is rotating slower than the second predetermined speed.

4. The bowed rotor prevention system of claim 1, wherein the first predetermined speed is faster than the second predetermined speed.

5. The bowed rotor prevention system of claim 1, wherein the clutch is one of an overrunning clutch and a self-synchronizing clutch.

6. The bowed rotor prevention system of claim 1, wherein the first turbomachine comprises a turbine, and the machine comprises a generator.

7. The bowed rotor prevention system of claim 1, wherein the pump is operative to pump the lubricant to the plurality of bearings based on a rotation of the third shaft by the second shaft.

8. The bowed rotor prevention system of claim 1, wherein the gearbox further comprises an input including rotatable fifth shaft.

9. The bowed rotor prevention system of claim 8, wherein the rotatable fifth shaft is rotatably coupled to a drive motor.

10. The bowed rotor prevention system of claim 9, wherein the fifth shaft is rotatably coupled to the drive motor via a clutch.

11. A method of preventing a bowed rotor condition of a turbomachine, comprising:
    coupling a rotatable first shaft of a first turbomachine to a rotatable second shaft of a machine;
    supporting at least one of the first and second shafts by a plurality of bearings;
    coupling a rotatable third shaft of a pump to the second shaft, the pump configured to pump a lubricant to the plurality of bearings;
    selectively coupling a rotatable fourth shaft of an output of a gear box to the third shaft;
    driving a rotation of the third shaft by rotating the second shaft, based on a first predetermined rotational speed of the first shaft;
    driving a rotation of the third shaft by rotating the fourth shaft based on a second predetermined rotational speed of the first shaft.

12. The method of claim 11, wherein the selective coupling of the fourth shaft to the third shaft is via a freewheel type clutch.

13. The method of claim 11, wherein the clutch is configured to operate in the freewheel condition when the first shaft is rotating faster than the first predetermined rotational speed.

14. The method of claim 11, wherein the clutch is configured to rotatably engage the fourth shaft to the third shaft when the first shall is rotating slower than the second predetermined speed.

15. The method of claim 11, wherein the first predetermined speed is faster than the second predetermined speed.

16. The method of claim 11, wherein the clutch is one of an overrunning clutch and a self-synchronizing clutch.

17. The method of claim 11, wherein the first turbomachine comprises a turbine, and the machine comprises a generator.

18. The method of claim 11, further comprising pumping the lubricant to the plurality of bearings with the pump, based on a rotation of the third shaft by the second shaft.

19. The method of claim 11, wherein the gearbox further comprises an input including rotatable fifth shaft.

20. The method of claim 19, wherein the fifth shaft is rotatably coupled to a drive motor.

21. A bowed rotor prevention system, comprising:
   a pump having a first shaft configured to rotatably couple to a shaft of a turbomachine system having a plurality of bearings, wherein the pump is configured to pump a lubricant to the plurality of bearings; and
   a gear box having an output comprising a second shaft rotatably coupled to the first shaft by a clutch configured to operate in a freewheel condition based on a first predetermined rotational speed of the shaft of the turbomachine system, and further configured to rotatably engage the second shaft to the first shaft based on a second predetermined rotational speed of the shaft of the turbomachine system, to thereby drive a rotation of the first shaft.

22. The bowed rotor prevention system of claim 21, comprising the turbomachine system having a gas turbine drivingly coupled to a generator.

\* \* \* \* \*